Patented Apr. 7, 1953

2,634,243

UNITED STATES PATENT OFFICE 2,634,243

PRODUCTION OF GAS-EXPANDED ORGANIC PLASTICS

Harry D. Glenn, Naugatuck, Conn., assignor to United States Rubber Company, New York, N. Y., a corporation of New Jersey No Drawing. Application December 22, 1949, Serial No. 134,607

5 Claims. (Cl. 260—2.5)

This invention relates to the manufacture of cellular rubber and plastics, and more particularly to the manufacture of chemically blown sponge rubber and chemically blown plastics.

In the manufacture of blown cellular rubber a gassing agent or compound capable of liberating gases at the temperature of vulcanization is required. Similarly, in the manufacture of cellular plastics, a gassing agent or compound capable of liberating gases at the molding temperature is required. The gases produced are responsible for the properties of the blown materials and the characteristics of their cellular structure.

Many gassing agents are known, such as ammonium sulfite, ammonium carbonate, sodium bicarbonate, etc. but they are not fully satisfactory. For example, only a part of the incorporated gassing agent is utilized and the unused portion may be undesirable in the finished product because of staining. Furthermore, certain of these gassing agents tend to liberate their gases prior to vulcanization because of too low decomposition temperatures. This is unfavorable since elevated temperatures are often associated with the incorporation of the necessary ingredients for the vulcanization of rubber and the molding of plastics. Thus in the manufacture of blown cellular rubber, it is common practice to incorporate the compounding ingredients, including the chemical blowing agent, with the rubber in a Banbury mill or on the conventional open rubber mill at moderately elevated temperatures. Furthermore, certain of these gassing agents used in the past are susceptible to variations in atmospheric conditions prior to their incorporation in rubber or plastics. This undesirable property often results in an inferior product.

I have discovered that a mixture of urea and oxalic acid is an effective blowing agent which does not decompose during its incorporation in rubber or plastic but evolves a mixture of gases during the vulcanization of the rubber or the molding of the plastic giving a finished cellular rubber or plastic of uniform cell size.

The molar proportions of urea and oxalic acid in the mixtures useful as blowing agents in the practice of my invention may vary from one mol of urea per mol of oxalic acid to five mols of urea per mol of oxalic acid. From the point of view of cost and convenience, I prefer to use a mixture wherein the molar ratio of urea to oxalic acid is 3:1.

It will be understood that chemical combination of the urea and the oxalic acid is not excluded from the scope of my invention. Thus, I have found that the complex or salt, urea oxalate, whether in the unhydrated form or in the form of a hydrate such as the monohydrate or the dihydrate, is a highly effective blowing agent.

In a typical preparation of rubber for the manufacture of blown sponge rubber, I add three to four parts of a mixture of urea and oxalic acid in a molar ratio of 3:1 to one hundred parts of rubber. The urea-oxalic acid mixture is preferably ground to a state of fine subdivision prior to its incorporation in order to enable it to be intimately and uniformly dispersed in the rubber. It may be added at any time during the compounding operation, but preferably it is added before the addition of other compounding ingredients in order to promote good dispersion. After the compounding is completed the mixture is ready for vulcanization.

Mixtures of urea and oxalic acid, suitable for use as gassing agents in the practice of my invention, are conveniently prepared by thoroughly mixing the proper proportions of the previously ground urea and oxalic acid. The mixing operation can be continued, if desired, until agglomeration or sintering of the mix occurs. Upon simply mixing the two ingredients together for a suitable length of time, they merge or coalesce into a solid solution. If desired, formation of the solid solution may be expedited by application of moderately elevated temperatures, say from 25° C. to 50° C. Where the oxalic acid is used in the form of the dihydrate, the solid solution is then dried at 70° C. to remove the water, and, after grinding or pulverizing, the resulting material is ready for use. For example, 18 grams (0.3 mole) of urea and 12.6 grams (0.1 mole) of oxalic acid dihydrate were mixed in a beaker by stirring for fifteen minutes. At the end of this period, sintering of the mix had taken place; the mixture was then dried for three hours at 70° C. The dry product was ground mechanically and was ready for use.

While hydrated oxalic acid may be employed in preparing a solid solution of urea and oxalic acid, I may use anhydrous oxalic acid with equally good results. The solid solution is obtained just as easily as with hydrated oxalic acid and perhaps even easier.

A simple physical mixture of urea and oxalic acid is just as effective in the present invention as a solid solution thereof.

The urea oxalate monohydrate is conveniently prepared by dissolving the two reagents in a mutual solvent such as water, methyl alcohol, ethyl alcohol, or mixtures of these solvents. For example, 100 grams of oxalic acid dihydrate was dissolved in a solution of 400 cc. of ethyl alcohol and 200 cc. of water and, after warming, 98 grams of urea was added. The homogeneous solution was cooled to separate urea oxalate monohydrate, and filtered. High yields were obtained and the filtrate served as an excellent reaction medium for further preparations of the salt.

Anhydrous urea oxalate, urea oxalate monohydrate, urea oxalate dihydrate, and mixtures of urea and oxalic acid in suitable proportions such as are disclosed above (whether in the form of solid solutions or not) are all substantially equivalent blowing agents in the practice of my invention.

The following examples illustrate my invention in more detail. All parts are by weight.

Examples A to H

As a means of evaluating mixtures of urea and oxalic acid and urea oxalate monohydrate as gassing agents, natural rubber master batches A to H were prepared. The urea-oxalic mixes and urea oxalate monohydrate were prepared as described above. The formulations are given in Table 1.

TABLE 1

|  | M. B. A | M. B. B | M. B. C | M. B. D | M. B. E | M. B. F | M. B. G | M. B. H |
|---|---|---|---|---|---|---|---|---|
| Brown Crepe | 100.0 | 100.0 | 100.0 | 100.0 | 100.0 | 100.0 | 100.0 | 100.0 |
| Whiting | 100.0 | 100.0 | 100.0 | 100.0 | 100.0 | 100.0 | 100.0 | 100.0 |
| Zinc Oxide | 5.0 | 5.0 | 5.0 | 5.0 | 5.0 | 5.0 | 5.0 | 5.0 |
| Light Oil | 10.0 | 15.0 | 15.0 | 15.0 | 15.0 | 15.0 | 15.0 | 15.0 |
| Stearic Acid | 12.0 | 3.0 | 3.0 | 3.0 | 3.0 | 3.0 | 3.0 | 3.0 |
| Acetone-diphenylamine condensate | 0.5 | 0.5 | 0.5 | 0.5 | 0.5 | 0.5 | 0.5 | 0.5 |
| Urea |  |  |  |  |  | 4.0 |  |  |
| Oxalic acid dihydrate |  |  |  |  | 4.0 |  |  |  |
| Urea-Oxalic Acid mix (5:1) |  |  |  |  |  |  | 4.0 |  |
| Urea-Oxalic Acid mix (4:1) |  |  |  |  |  |  |  | 4.0 |
| Urea-Oxalic Acid mix (3:1) |  |  |  | 4.0 |  |  |  |  |
| Urea-Oxalic Acid mix (2:1) |  |  | 4.0 |  |  |  |  |  |
| Urea Oxalate Monohydrate |  | 4.0 |  |  |  |  |  |  |
| Sodium Bicarbonate | 15.0 |  |  |  |  |  |  |  |
|  | 242.5 | 227.5 | 227.5 | 227.5 | 227.5 | 227.5 | 227.5 | 227.5 |

These master batches were mixed in a Banbury mixer at 170° to 180° F. for eight minutes and then transferred to an open rubber mill for the incorporation of sulfur and accelerator in proportions given in Table 2.

TABLE 2

|  | Stock A | Stock B | Stock C | Stock D | Stock E | Stock F | Stock G | Stock H |
|---|---|---|---|---|---|---|---|---|
| Master Batch A | 242.5 |  |  |  |  |  |  |  |
| Master Batch B |  | 227.5 |  |  |  |  |  |  |
| Master Batch C |  |  | 227.5 |  |  |  |  |  |
| Master Batch D |  |  |  | 227.5 |  |  |  |  |
| Master Batch E |  |  |  |  | 227.5 |  |  |  |
| Master Batch F |  |  |  |  |  | 227.5 |  |  |
| Master Batch G |  |  |  |  |  |  | 227.5 |  |
| Master Batch H |  |  |  |  |  |  |  | 227.5 |
| Sulfur | 2.5 | 2.5 | 2.5 | 2.5 | 2.5 | 2.5 | 2.5 | 2.5 |
| Tetramethyl-thiuramdisulfide (accelerator) | 0.35 | 0.35 | 0.35 | 0.35 | 0.35 | 0.35 | 0.35 | 0.35 |

The thoroughly mixed stocks were sheeted out to a thickness of 0.2–0.4 inch. Circular discs were cut with a die and the weight of each sample was adjusted to 40 grams. The samples were measured, placed in circular molds (three inches in diameter by three-quarters of an inch deep) and press-cured for ten minutes at 325° F. The stocks were removed from the mold and measured; then they were cut open and their cell structure examined. The data on the above stocks are given in the following Table 3.

TABLE 3

|  | Stock A | Stock B | Stock C | Stock D | Stock E | Stock F | Stock G | Stock H |
|---|---|---|---|---|---|---|---|---|
| Before Curing: |  |  |  |  |  |  |  |  |
| Weight, grams | 40.0 | 40.0 | 40.0 | 40.0 | 40.0 | 40.0 | 40.0 | 40.0 |
| Diameter | 2.75 | 2.812 | 2.531 | 2.781 | 2.781 | 2.812 | 2.78 | 2.75 |
| Gauge | 0.312 | 0.218 | 0.375 | 0.343 | 0.343 | 0.312 | 0.312 | 0.343 |
| After Curing: |  |  |  |  |  |  |  |  |
| Weight, grams | 40.0 | 40.0 | 40.0 | 40.0 | 40.0 | 40.0 | 40.0 | 40.0 |
| Diameter | 2.937 | 2.937 | 2.875 | 2.843 | 2.812 | 2.906 | 2.906 | 2.875 |
| Gauge | 0.718 | 0.718 | 0.718 | 0.531 | 0.531 | 0.406 | 0.656 | 0.687 |
| Cell Structure | good | good | good | good | very poor | very poor | good | good |
| Color | do | do | do | do | good | good | do | Do. |

Inspection of Tables 1 to 3 shows that the use of 4 parts of the blowing agents of the present invention per 100 parts of rubber produced results equivalent to those obtained with 15 parts of sodium bicarbonate, the most common blowing agent heretofore used and, at the same time, permitted reduction of the amount of stearic acid from 12 to 3 parts.

Furthermore, comparison of stocks E and F, which were made with oxalic acid dihydrate alone and with urea alone, respectively, as the blowing agents, with stocks B, C, D, G and H which were made with blowing agents of the present invention, shows that there is a unique cooperation between oxalic acid and urea when used together, since stocks E and F gave very poor results.

Any type of rubber which is curable or vulcanizable to a solid state may be blown in accordance with my invention. Examples are natural rubber and synthetic rubbers such as rubbery copolymers of butadiene with styrene or acrylonitrile (known as GR–S and Buna N, respectively), rubbery copolymers of isobutylene with a small proportion of butadiene or isoprene (known as Butyl rubber), and polychloroprene. With the rubber is incorporated the usual compounding ingredients including curing or vulcanizing agents, such as sulfur, accelerators, activators, anti-oxidants, plasticizers, softeners, pigments, fillers, dyestuffs, etc.

My invention may be employed to expand any organoplastic material which is capable of setting to a normally solid state and having sufficient consistency and tensile strength under the conditions of the expansion step to retain the evolved expanding gas and the resulting expanded structure.

Examples of organoplastic materials other than rubber which may be expanded in accordance with my invention are resins such as alkyd resins, urea-formaldehyde resins, polymerized unsaturated materials such as polyacrylonitrile, polystyrene, polyvinyl chloride, copolymers of vinyl chloride and vinyl acetate, amorphous non-resinous plastic materials such as cellulose esters for example cellulose acetate, cellulose ethers such as ethyl cellulose, etc. The organoplastic may be of either the thermoplastic or the thermosetting type and it may be of a type of which polymerization is furthered or completed during the step of heating to generate the gas.

My invention is conveniently applied to the manufacture of gas-expanded plasticized resin articles from plastisols which, as is well-known, are paste-like mixtures of unplasticized resin particles with a plasticizer therefor which does not dissolve the resin at ordinary temperature, but which exhibit the characteristic that upon being heated to moderately elevated temperatures (of the same order as the temperatures at which the chemical blowing agent decomposes to generate the expanding gas) the plasticizer dissolves the resin and forms a gel which upon cooling to room temperature assumes a solid condition. Such gas-expanded plasticizer resin articles are commonly made by mixing the chemical blowing agent with the plastisol, filling a mold cavity formed by a sectional mold with the resulting paste-like mixture, closing the mold under high pressure, and "pre-heating" the mixture in the mold cavity to effect simultaneous gelation of the plastisol and generation of the blowing gas from the blowing agent, cooling the article in the mold, removing the molded miniature article, and expanding it to final form by immersing it in a heated fluid medium in which it is free to expand. This final expansion step softens the resin to such an extent that the gas contained under pressure in very small pores in the pre-molded article can cause the pores to become greatly enlarged. Upon cooling, the final article retains its final expanded shape.

*Examples I to M*

As a means of evaluating mixtures of urea and oxalic acid and urea oxalate monohydrate as gassing agents for plastics, plastisols I to M were prepared as shown in Table 4.

TABLE 4

|  | Plastisol I | Plastisol J | Plastisol K | Plastisol L | Plastisol M |
|---|---|---|---|---|---|
| Polyvinyl chloride | 12.5 | 12.5 | 12.5 | 12.5 | 12.5 |
| Urea |  |  |  | 3.0 |  |
| Oxalic Acid Dihydrate |  |  |  |  | 3.0 |
| Urea-Oxalic Acid mix (2:1) | 4.0 |  |  |  |  |
| Urea-Oxalic Acid mix (3:1) |  |  | 4.0 |  |  |
| Urea Oxalate Monohydrate |  | 4.0 |  |  |  |
| Tricresyl Phosphate | 12.5 | 12.8 | 12.5 | 11.5 | 11.5 |
| Calcium Stearate (Stabilizer) | 0.63 | 0.63 | 0.63 | 0.63 | 0.63 |

The mixing of the ingredients for each plastisol was done with a pestle in a mortar until homogeneity and desired consistency was obtained. A chromium-plated steel sectional mold with two sections having cooperating 0.75 inch diameter (2.36 in. circumf.) circular cavities was filled with the plastisol and heated for 8 to 10 minutes at 170° to 180° C. under a mold-closing pressure of 10,000 p. s. i. The mold was cooled quickly to room temperature by running tap water through the press. The mold was removed from the press, opened, and the molded samples transferred into a hot water bath (70° to 80° C.) until they expanded to maximum dimensions (15 to 45 minutes). The blow samples were measured; they were then cut open and the cell structure examined. Data on these blown plastics are given in the following Table 5.

TABLE 5

|  | Plastisol I | Plastisol J | Plastisol K | Plastisol L | Plastisol M |
|---|---|---|---|---|---|
| Circumference, inches | 5.1 | 5.1 | 4.5 | 4.4 | 2.4. |
| Cell Structure | Very fine | Very fine | Very fine | Very coarse | Coarse. |
| Color | White | White | White | Brown | White. |

The results given in Table 5 show that plastisols I, J and K, which were blown in accordance with the present invention, gave far better results than comparison plastisols L and M which were blown with urea alone and oxalic acid alone, respectively.

The method of processing the rubber or other organoplastic so as to obtain the desired type of cell structure that is, closed-cell or open-cell or a combination of both, are very well-known to those skilled in the art and therefore need not be described herein since they do not per se constitute any part of the present invention. My invention resides in the use of the novel blowing agents described herein and not in any particular method of blowing.

The amount of the blowing agent employed in the practice of the present invention may vary widely. In general, however, substantially less of the blowing agent of my invention is used than is the case with conventional blowing agents. Typically, I use from 1 to 10 parts per 100 parts of rubber and from 20 to 40 parts per 100 parts of other thermoplastic. In the case of rubber I often employ from 2 to 5 parts of the blowing agent per 100 parts of rubber.

The temperature used in the expanding step may vary over wide limits. In the case of articles containing vulcanizable rubber, the temperature is commonly such as to simultaneously decompose the blowing agent and vulcanize the rubber at least sufficiently to retain the liberated gas. In the case of other organoplastics the temperatures should of course be sufficiently high to decompose the blowing agent and, at the same time to accomplish any other action desired, such as to gelatinize a plastisol or advance a polymerizable material to a point at which it will retain the gas or otherwise effect partial or complete setting of the plastic. Temperatures of the order of 160° to 200° C. are commonly employed in effecting the decomposition of the blowing agent and consequent expansion of the mix. in the practice of my invention.

The term "organoplastic' is used herein to denote organic plastic materials.

The present invention has many advantages among which the following may be mentioned.

1. Relatively small quantities of the gassing agent are required, as compared to conventional gassing agents, for manufacturing a given volume of blown rubber sponge.
2. Large excesses of expensive fatty acids are not necessary to insure desirable blown sponge.
3. A finer cell size is obtained.
4. Variations in finished product due to changes in properties of gassing agent as affected by atmospheric conditions are absent.
5. Large quantities of unused gassing agent do not remain in the finished rubber.
6. The blowing agent is not prohibitively expensive.
7. The blowing agent can be incorporated into the rubber or plastic at ordinary milling or mixing temperatures without decomposition. Such temperatures generally do not exceed 100° C.
8. The blowing agent can be used directly in conventional rubber and plastic blowing processes without change in such processes.
9. The blowing agent decomposes to liberate large volumes of gas at the elevated temperatures commonly used in curing and molding rubber and plastic articles.
10. The blowing agent does not injure the rubber or plastic.

Having thus described my invention what I claim and desire to protect by Letters Patent is:

1. A method of making a gas-expanded organoplastic material which comprises mixing urea oxalate as a blowing agent with an expandable organoplasic material which is capable of setting to a normally solid state and having sufficient consistency and tensile strength under the conditions of the decomposing step to retain the evolved expanding gas and the resulting expanded structure, the amount of said urea oxalate ranging from 1 to 40 parts per 100 parts of said organoplastic material, subsequently decomposing said urea oxalate by heat to evolve gas, causing said evolved gas to be retained in and to expand said organoplastic material, and causing said organoplastic material to set and retain its expanded condition.

2. A method of making a gas-expanded organoplastic material which comprises mixing a blowing agent selected from the group consisting of physical mixtures and solid solutions of urea and oxalic acid in proportions corresponding to from 1 to 5 mols of urea per mol of oxalic acid and urea oxalate with an expandable organoplastic material which is capable of setting to a normally solid state and having sufficient consistency and tensile strength under the conditions of the decomposing step to retain the evolved expanding gas and the resulting expanded structure, the amount of said blowing agent ranging from 1 to 40 parts per 100 parts of said organoplastic material, subsequently decomposing said blowing agent by heat to evolve gas, causing said evolved gas to be retained in and to expand said organoplastic material, and causing said organoplastic material to set and retain its expanded condition.

3. A method of making gas-expanded rubber which comprises mixing a blowing agent selected from the group consisting of physical mixtures and solid solutions of urea and oxalic acid in proportions corresponding to from 1 to 5 mols of urea per mol of oxalic acid and urea oxalate with a vulcanizable rubber mixture, the amount of said blowing agent ranging from 1 to 10 parts per 100 parts of rubber, subsequently decomposing said blowing agent by heat to evolve gas, causing said evolved gas to be retained in and to expand said rubber mixture, and curing said rubber to cause it to retain its expanded condition.

4. A method of making a gas-expanded plasticized thermoplastic resinous material which comprises heating a mixture of a particulate thermoplastic resin, a plasticizer therefor and a blowing agent selected from the group consisting of physical mixtures and solid solutions of urea and oxalic acid in proportions corresponding to from 1 to 5 mols of urea per mol of oxalic acid and urea oxalate, said resin and plasticizer forming upon gelatinization of said resin with said plasticizer a gel which has sufficient consistency and tensile strength under the conditions of the gelatinizing and decomposing step to retain the evolved expanding gas and the resulting expanded structure and which upon cooling to room temperature assumes a solid condition, the amount of said blowing agent ranging from 1 to 40 parts per 100 parts of said resin, and thereby causing said resin and plasticizer to gelatinize and decomposing said blowing agent with the evolution of gas therefrom, causing said gas to be retained in and to expand the gelatinized mixture, and cooling the resulting expanded gelatinized mixture thereby causing it to set and retain its expanded condition.

5. A method as recited in claim 2 wherein the relative proportions of said urea and oxalic acid are such that the molar ratio of urea to oxalic acid is 3:1.

HARRY D. GLENN.

(References on following page)

REFERENCES CITED

The following references are of record in the file of this patent:

UNITED STATES PATENTS

| Number | Name | Date |
|---|---|---|
| 1,990,925 | Bennett | Feb. 12, 1935 |
| 2,131,126 | Ter Horst | Sept. 27, 1938 |
| 2,132,969 | Rau | Oct. 11, 1938 |

OTHER REFERENCES

Report No. 47–3, May 1947, "Unicel ND," pages 1 and 2, pub. by Rubber Chemicals Div., Du Pont, Wilmington, Del.

Report No. 48–2, June 1948, "Unicel S," pages 1, 3 and 4, Rubber Chem. Div., Du Pont.

Vanderbilt 1942 Rubber Handbook, 8th ed., 1942, page 30, pub. by R. T. Vanderbilt Co., New York. (Copy in Div. 50.)

Pryer, Revue Gen. de Caoutchouc, vol. 27, No. 12, 1950, page 721.

Schwarz India Rubber World, May 1946, pages 211, 212, 219.

Biltz, J. prakt. Chem., 106, page 154 (1923).

Beilstein's Handbuch der Org. Chemie, vol. 3, page 55.